March 5, 1935.   F. B. VOLTZ   1,993,127
STREAM LINE LIGHT COVER
Filed April 12, 1934   2 Sheets-Sheet 1

INVENTOR:
Francis Benedict Voltz
BY Chauncey P. Carter
ATTORNEY.

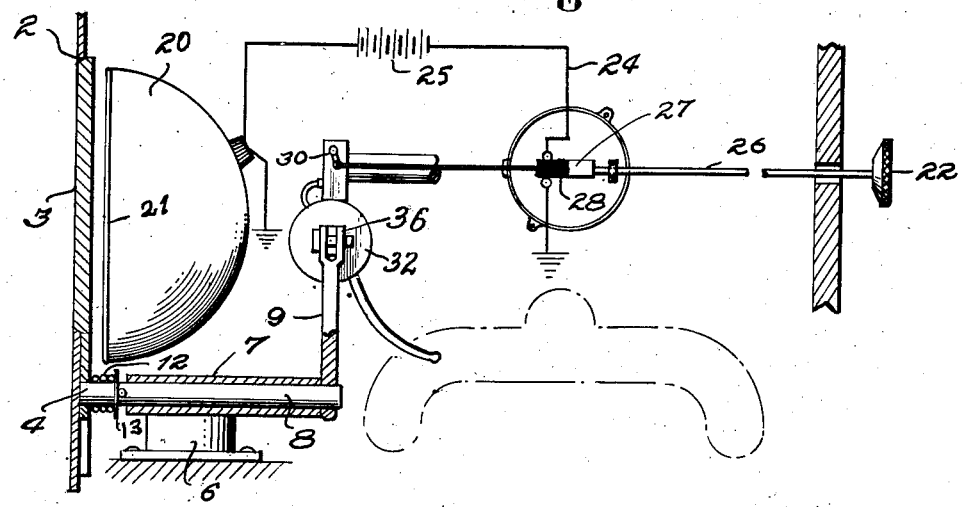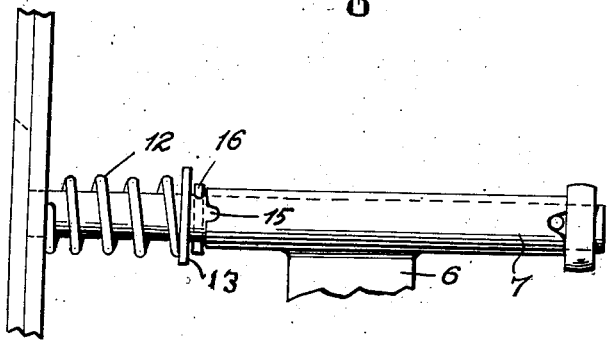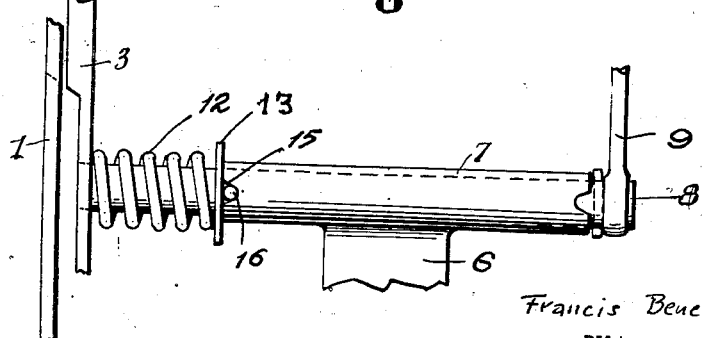

Patented Mar. 5, 1935

1,993,127

UNITED STATES PATENT OFFICE 1,993,127

STREAM LINE LIGHT COVER

Francis Benedict Voltz, Opelousas, La.

Application April 12, 1934, Serial No. 720,286

3 Claims. (Cl. 240—7.1)

This invention relates to an automobile light, one object of which is to provide a light under the hood or cover of an automobile without materially obstructing the stream line of the automobile hood or cover.

Another object of the invention is to provide a cover for the usual lens of an automobile, which cover is normally located back of an opening in the hood and is moved to uncover the lamp and lens at the option of the operator.

Another object of the invention is to provide such a cover behind the automobile hood and have it project somewhat into the opening in the hood to preserve the stream lines of the hood.

With these and other objects in view, I will now proceed to describe my invention in connection with the accompanying drawings in which:—

Figure 3 is a view showing a conventional form of wiring and connecting the operating means to the automobile.

Figure 4 is a detailed view showing the pivot of the operating mechanism in one position with the operating rod and cover in closed position.

Figure 5 is a view similar to Figure 4 but showing the parts with the cover in open position.

Figure 1:
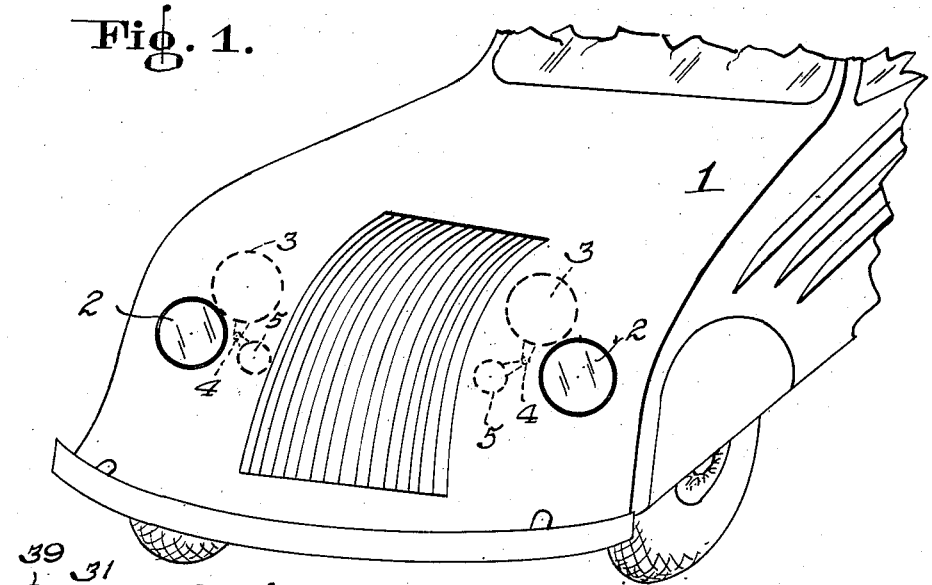
Figure 1 shows an automobile hood built on modern stream line with my light cover applied thereto.

1 is an automobile hood constructed on the modern stream line idea, shaped to prevent air resistance. 2—2 are holes in the automobile hood and 3—3 are the covers for the holes. The covers 3—3 are pivoted at 4—4 and are conveniently counter-balanced by weights 5—5.

The pivots 4 may be supported in any convenient way as on a column 6 (Figure 3) attached to any convenient portion of the automobile. The column 6 has a tubular hollow rod 7 rigidly attached thereto. Within the rod 7 is a pivot portion 8, which is a continuation of the pivot portion 4, having rigidly attached thereto an arm 9 so that movement of the arm 9 necessarily oscillates the rod 8. At the other end of the pivot portion 4 of the rod 8, opposite the end carrying the arm 9, is attached the cover 3 and to ease the operation of the cover 3 I may provide a counterweight 5.

The cover 3 is intended to be moved in front of the hole 2 and since the stream lines of the hood are to be preserved, it is desirable that the cover 3 be of such a size as to fit within the hole 2 in the hood, as shown best in Figure 3. The hood 1 is normally quite thin and it is only necessary to move the cover 3 very slightly to bring the cover 3 on the level with the outside surface of the hood. These parts, as shown in Figure 5, are exaggerated as to thickness for clearness of illustration.

The edges of the cover 3 are slightly inclined to fit in corresponding edges in the hole 2 and when the cover is brought to its full position opposite the hole 2 it is given a slight motion to bring the cover 3 on a level with the outside surface of the hood. To do this, I provide the rod 8 with a spring 12, one end of which is fastened to the pivot 8 and rests against the side of the stem of the cover 3. The other end of the spring rests against a ring 13. The hollow rod 7 surrounding the pivot 8 is provided with a notch 15. This notch is conical shape and is adapted to receive a pin 16 attached to the pivot 8 and as the arm 9 is moved to turn the pivot 8, the pin 16 rides on the extreme end of the rod 7 and drops in the notch 15 which allows the cover 3 to be moved to the right slightly and eases the movement of the cover out of the hole in the hood. After the cover is moved to its closed position, the pin 16 rests on the extreme end of the tube 7 (Figure 4) and being under the action of the spring 12 the parts are kept from rattling. The normal position of the pin 16 is against the unbroken end of the tube 7 and in this normal position the cover 3 is additionally forced to its seat in the hole 2 of the hood. When the arm 9 is moved, the pin 16 is allowed to drop into a slot 15 to somewhat relieve the pressure on the cover 3 and allow it to be more easily withdrawn from the hole 2 by the coaction of the beveled edges of the cover and hole. The spring 12 will take up the play between the parts and in either position of the cover will prevent undue noise.

The automobile reflector 20 may be of the ordinary construction with any desired kind of a lens 21. This reflector with the light therein is immediately back of the hole 2 and I find it quite advantageous to protect the lens by the cover 3.

Figure 6:
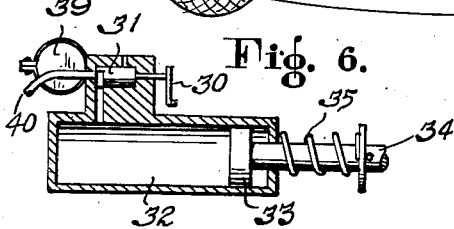
Figure 6 is a sectional view of the valve and cylinder through which the cover is operated and Figure 7 is a view of the cover with its balancing weight.
Figure 2:
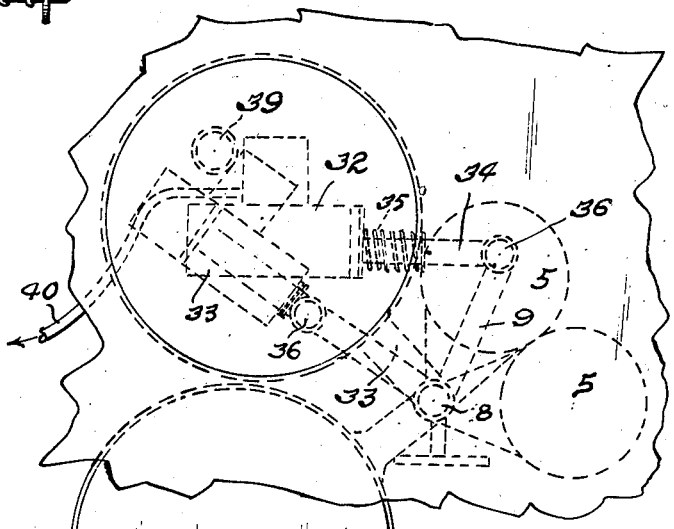
Figure 2 is a view of the mechanism for operating the lens cover.
Figure 7:
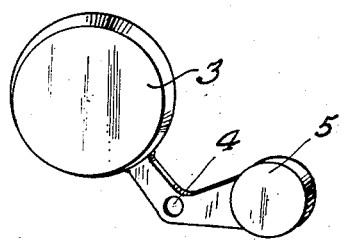

The cover may be operated in any convenient way. I have shown in Figures 2 and 3 a conventional way of operating the cover. 22 may be a button or knob on the dashboard of the automobile or on the steering wheel. I have herein shown a circuit 24 with the ordinary battery 25. On the stem 26 of the button 22 I have shown a switch with the conducting portion 27 and a non-conducting portion 28 between the two terminals of the circuit 24. When this button is pushed in, the light will be turned on. I have also shown the continuation of the stem 26 to a crank 30. The crank may be rigid with a plug valve 31 which when turned in one direction will open to the air cylinder 32, including a piston 33 therein and a piston rod 34 having a surrounding spring 35. This piston rod is pivoted at 36 to the arm 9 fixed to the pivot portion 8. The cylinder 32 is held in a bracket pivoted on a stub shaft 39. Extending from the valve 31 may be a tube 40 connected, for example, to the intake of the manifold. It is apparent from the construction shown that by pushing on the button 22 to turn on the light the valve 31 may also be operated to a position where the suction caused in the intake will produce a partial vacuum in the cylinder 32 and draw the piston to the left (Figure 6) against the pressure of the spring 35. This will oscillate the rod 8 to move the cover 3 to open position. The cover may then be restored to its closed position on the stopping of the automobile and its elements by eliminating the vacuum in the piston 32. This mechanism for operating the cover may be changed to suit the taste of the user of the cover.

I have only shown operating mechanism for one of the covers. The other cover may be operated from the one shown operated in obvious ways or an additional operating mechanism similar to the one shown may be provided to operate the other cover.

It is apparent that many of the details of my invention may be changed without departing from the spirit of the invention, the only essential features of which are covered in the appended claims.

What I claim is:—

1. An automobile having a hood portion shaped to obtain stream line effects and avoid air resistance, said hood portion having a hole in its stream lined surface, a headlight back of the hole, a cover movable between the headlight and the hole and when covering said hole preserving said stream line effects and means for operating the cover.

2. A vehicle having a body portion shaped to secure stream line effects to avoid resistance of the air, said body portion having a hole in its stream lined portion, a headlight back of the hole and a cover movable between the headlight and the hole, said cover being adapted to be projected into the hole from the rear of the body portion and means to force the cover partially into the hole to preserve the stream line effects over the body portion when the cover is closed.

3. A vehicle having a hood shaped to obtain streamline effects and prevent air obstruction, a headlight under the hood, said hood having a hole in its streamlined portion, a cover for the hole movable between the same and the headlight and means to push the closed cover into the hole to bring the outer surface of the cover substantially flush with the outer surface of the streamlined portion of the hood to retain the streamline effect of the hood.

FRANCIS BENEDICT VOLTZ.